United States Patent [19]

Shimodaira et al.

[11] Patent Number: 4,807,969
[45] Date of Patent: Feb. 28, 1989

[54] METHOD OF MANUFACTURING A REFLECTOR OF A FIBER-REINFORCED PLASTIC MATERIAL

[75] Inventors: Hisayo Shimodaira; Toshio Ono, both of Sagamihara, Japan

[73] Assignee: Mitsubishi Denki Kabushiki Kaisha, Tokyo, Japan

[21] Appl. No.: 44,210

[22] Filed: Apr. 30, 1987

[51] Int. Cl.⁴ ............................................. G02B 5/10
[52] U.S. Cl. .................................... 350/320; 156/242
[58] Field of Search ................. 350/320, 1.1; 156/242

[56] References Cited

U.S. PATENT DOCUMENTS 1,461,301 7/1923 Wiskott .............................. 350/320
3,317,640 5/1967 Jones ................................. 350/320
4,124,277 11/1978 Stang ................................ 350/320
4,465,734 8/1984 Laroche et al. ..................... 350/641

FOREIGN PATENT DOCUMENTS 3216844 3/1983 Fed. Rep. of Germany .
3612325 4/1986 Fed. Rep. of Germany .

Primary Examiner—Bruce Y. Arnold
Attorney, Agent, or Firm—Oblon, Fisher, Spivak, McClelland & Maier

[57] ABSTRACT

A reflector reflecting light ranging from infrared rays to visible rays is formed by placing on a forming mold a thin glass plate, putting a semi-cured product formed by impregnating a reinforcing fabric material with a resin, compressing and heating a laminated body of the glass plate and the semi-cured product, removing the formed laminated body and forming a reflecting film on the glass plate.

4 Claims, 2 Drawing Sheets

METHOD OF MANUFACTURING A REFLECTOR OF A FIBER-REINFORCED PLASTIC MATERIAL

BACKGROUND OF THE INVENTION

1. Field of the Invention

The present invention relates to a method of manufacturing a reflector comprising a fiber-reinforced plastic material (hereinbelow, referred to as a FRP) which reflects light ranging from infrared rays to visible rays.

2. Discussion of Background

FIG. 4 is a schematic view in cross-section of a conventional reflector during manufacture and FIG. 5 is a cross-sectional view of the reflector as a manufactured product.

In FIGS. 4 and 5, the reference numeral 1 designates a forming mold, a numeral 2 designates a reflecting film formed on a convex surface of the forming mold 1 by vapor-deposition, and a numeral 3 designates a product as a material to be shaped by molding which is formed by impregnating previously a reinforcing fabric material with a resin (the product being referred to as a prepreg) which is pressed on the forming mold 1. A character A designates a reflection mirror comprising an FRP plate 4 and the reflecting film 2, the FRP plate 4 being obtained by compressing and heating the prepreg 3, followed by curing it.

In the conventional manufacturing method, the forming mold 1 finished with a given accuracy to have a predetermined shape is prepared; the reflecting film 2 such as an aluminum film is formed on a surface of the mold 1 by vapor-deposition; the prepreg 3 is laminated on the reflecting film 2; and compressing and heating the laminated body followed by curing of a resin impregnated with the prepreg 3, whereby the shape of the forming mold 1 is transferred to the FRP 4. Thus, the reflector A of the FRP is prepared as shown in FIG. 5.

FIG. 6 is a schematic view in cross-section showning another method of manufacturing a conventional reflector. The reflector prepared by the method as shown in FIG. 6 has a sandwiched structure unlike the reflector having a single FRP as shown in FIG. 5.

In FIG. 6, reference numerals 4, 4a designate FRP plates and a numeral 5 designates a core material constituted by a honeycomb body or a flexible core body made of a thin metallic plate or a fiber-reinforced plastic plate, or a polymeric foamed body. The core material 5 is bonded to the FRP plates 4, 4a by an adhesive 6.

In the manufacturing method as shown in FIG. 6, a reflector A having the sandwiched structure is obtained by forming the reflecting film 2 on the forming mold 1, laminating the prepreg 3 on the reflecting film 2, heating the prepreg 3 under a pressure to form the FRP plate 4, putting on the FRP plate 4 the core material 5 and the FRP plate 4a (which is prepared separately), and bonding these members by the adhesive 6.

In the conventional methods of making the reflector, a cavity or a recess is produced in the reflecting surface due to shrinkage of the prepreg 3 while the resin cures. The cavity or the recess reduces accuracy in the mirror surface, hence, the percentage of normal reflection is reduced.

The conventional method also has such disadvantage that the reflecting film 2 can not be removed to correct the shape of the reflecting surface or to finish the surface to improve the surface roughness when the molded product does not have a desired shape and accuracy even though the forming mold 1 having a predetermined shape with a given accuracy is used.

SUMMARY OF THE INVENTION

It is an object of the present invention to provide a method of manufacturing a reflector of a fiber-reinforced plastic material which is free from cavities or recesses, provide the percentage of a specific normal reflection, a shape and accuracy, and wherein the reflecting surface is capable of being polished if necessary.

The foregoing and the other objects of the present invention have been attained by providing a method of manufacturing a reflector of a fiber-reinforced plastic material characterized by: (a) placing a thin glass plate on a forming mold made of a material having a small linear expansion coefficient, having a predetermined shape to have the glass plate take a curved-shape and finished with a given accuracy; (b) putting on the glass plate a semi-cured product formed by impregnating a reinforcing fabric material with a resin; (c) compressing and heating a laminated body of the glass plate and the semi-cured product on the forming mold; (d) removing the laminated body having a curved-shape from the forming mold; and, (e) forming a reflecting film on the front surface of the glass plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
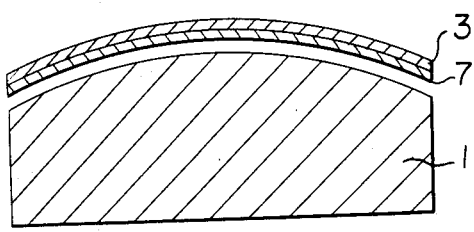
FIG. 1 is a schematic view in cross-section showing an embodiment of the method of manufacturing a reflector according to the present invention.
Figure 2:
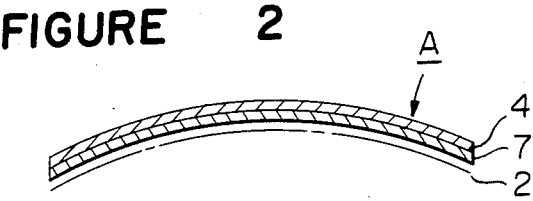
FIG. 2 is a cross-sectional view of the reflector manufactured by the method as shown in FIG. 1.

Referring now to the drawings, wherein like reference numerals designate the same or corresponding parts throughout the several views, and more particularly to FIGS. 1 and 2 thereof, there is shown a method of manufacturing a reflector and the reflector prepared by the method according to the present invention.

In FIGS. 1 and 2, the forming mold 1 is made of a material having a small linear expansion coefficient and finished with a given accuracy to have a predetermined curved-shape. A reference numeral 7 designates a thin flat glass plate or a thin curved glass plate having a predetermined curved line which is placed on the forming mold 1. A numeral 3 designates a prepreg on the glass plate 7 to be laminated.

According to the method of manufacturing a reflector A of the present invention, the thin glass plate 7 is placed on the forming mold 1 and the prepreg 3 is put on the thin glass plate 7. Then, the glass plate 7 and the prepreg 3 are subjected to compression and heating on the forming mold 1 followed by curing. In this process, the glass plate 7 is bonded to the FRP plate 4 as the cured prepreg 3 and at the same time, the shape and the surface accuracy of the contacting surface of the forming mold 1 are transferred to the glass plate 7. Then, the bonded FRP plate 4 and the glass plate 7 are removed from the forming mold 1, and the reflecting film 2 such as an aluminum film is formed on the surface of the glass plate by vapor-deposition as shown in FIG. 2; thus, the reflection mirror A of the FRP is obtained.

In the reflector A thus obtained, a cavity or a recess is not produced on the surface on which the reflecting film is formed because of presence of the glass plate 7 even though shrinkage is produced in the prepreg 3 by the curing of the resin. Accordingly, the reflecting surface is smooth and therefore, the reflector A having a highly accurate surface can be produced. Further, if necessary, it is possible to carry out fine finishing such as polishing the surface of the glass plate 7 on which the reflecting film is formed to thereby improve the accuracy of the mirror surface after the laminated body of the prepreg 3 and the glass plate 7 has been removed.

Figure 3:
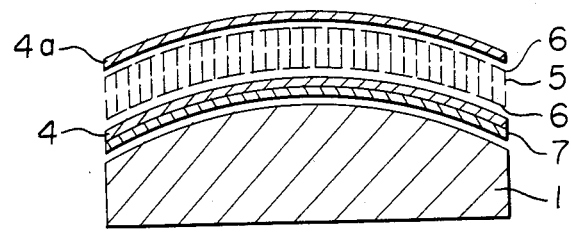
FIG. 3 is a schematic view in cross-section showing another embodiment of the method of manufacturing a reflector according to the present invention.
Figure 4:
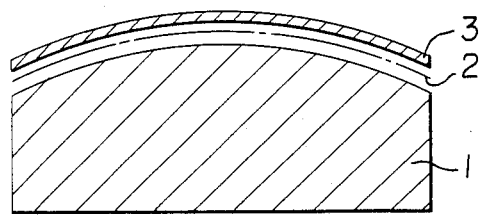
FIG. 4 is a schematic view in cross-section showing a conventional method of manufacturing a reflector.
Figure 5:
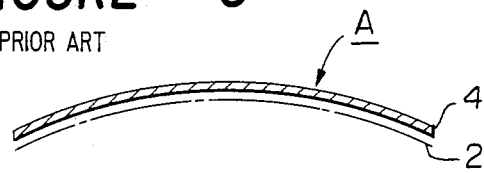
FIG. 5 is a cross-sectional view of the reflector manufactured by the method as shown in FIG. 4.
Figure 6:
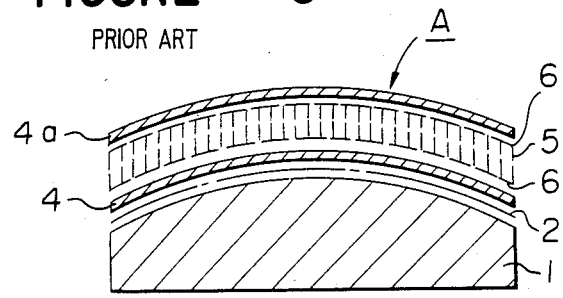
FIG. 6 is a schematic view in cross-section of another conventional method of manufacturing a reflector.

In the above-mentioned embodiment, the reflector is made of a single FRP plate. FIG. 3 shows another embodiment of the method of manufacturing the reflector according to the present invention. In FIG. 3, besides the FRP plate 4 being prepared by compressing and heating the glass plate 7 and the prepreg 3 on the forming mold 1, a separate FRP plate 4a having a predetermined shape and a given accuracy is formed. Further, a core material 5 is also separately prepared. The core material 5 is constituted by a honeycomb body or a flexible body comprising a thin metallic plate or a thin fiber-reinforced plastic plate, or a polymeric foamed body. The core material 5 is sandwiched by the two FRP plates 4 and 4a by an adhesive 6 in which the reflecting film 2 faces outside. By this method, the reflector A having a fine surface can also be obtained.

Thus, in accordance with the present invention, by compressing and heating the laminated body of the thin glass plate and the prepreg on the forming mold followed by curing, any cavity and recess which is caused by the shrinkage of the resin impregnated in the prepreg is not produced in the surface of the glass plate on which the reflecting film is formed. Accordingly, a reflector of the FRP having a high percentage of normal reflection and a highly accurate surface can be obtained. Further, a polishing operation can be carried out to the glass plate to improve the surface accuracy of the glass plate.

What is claimed is:

1. A method of manufacturing a reflector of a fiber-reinforced plastic material, comprising:
   (a) placing a thin glass plate on a forming mold made of a material having a small linear expansion coefficient, having a predetermined shape to have said glass plate take a curved-shape and finished with a given accuracy;
   (b) placing on said glass plate a semi-cured product formed by impregnating a reinforcing fabric material with a resin;
   (c) compressing and heating a laminated body of said glass plate and said semi-cured product on said forming mold;
   (d) removing said laminated body having a curved-shape; and,
   (e) forming a reflecting film on the front surface of said glass plate.

2. The method of manufacturing a reflector according to claim 1, wherein a surface of said glass plate to which said reflecting film is attached is mirror-finished before said reflecting film is formed.

3. The method of manufacturing a reflector according to claim 1, which further comprises;
   preparing a separate fiber reinforced plastic plate having a predetermined curved form; and
   laminating said separately prepared fiber reinforced plastic plate and said reflector prepared by steps (a) to (e) of claim 1 through a bonding intermediate layer of light weight core material.

4. The method of manufacturing a reflector according to claim 3, wherein said intermediate core material is a honeycombed body, a flexible body which is a thin metallic plate, a thin fiber-reinforced plastic plate or a foamed polymeric body.

* * * * *